United States Patent [19]
Birchall et al.

[11] 3,804,648
[45] Apr. 16, 1974

[54] GRAPHITE COMPOSITIONS

[75] Inventors: James Derek Birchall; John Edward Cassidy, both of Runcorn, England

[73] Assignee: Imperial Chemical Industries Limited, London, England

[22] Filed: Nov. 29, 1971

[21] Appl. No.: 203,028

[30] Foreign Application Priority Data
Dec. 11, 1970 Great Britain.................... 59039/70

[52] U.S. Cl..................................... 106/56, 106/85
[51] Int. Cl............................................ C04b 35/52
[58] Field of Search.................. 106/56, 85; 252/508

[56] References Cited
UNITED STATES PATENTS

| | | | |
|---|---|---|---|
| 2,685,539 | 8/1954 | Woodburn et al..................... | 106/56 |
| 2,906,632 | 9/1959 | Nickerson............................... | 106/56 |
| 3,342,627 | 9/1967 | Paxton et al........................... | 106/56 |
| 3,303,031 | 2/1967 | Shields................................... | 106/56 |

*Primary Examiner*—James E. Poer
*Attorney, Agent, or Firm*—Cushman, Darby & Cushman

[57] ABSTRACT

A composition suitable for a wide range of purposes such as producing shaped articles, including refractory crucibles, which comprises
  a. a graphite
  b. a binder consisting of either
  i. a complex phosphate of aluminium containing at least one chemically bound molecule of a hydroxy compound, ROH, wherein R is an organic group or hydrogen and an anionic group of a strong inorganic acid, other than an oxy-phosphorus acid, or of a carboxylic acid, or ii. an aluminium phosphate in which the ratio of the number of gram atoms of aluminium to the number of gram atoms of phosphorus is at least 1:1; and
  c. a dispersant for the binder.

19 Claims, No Drawings

GRAPHITE COMPOSITIONS

This invention relates to graphite compositions.

According to the present invention there is provided a composition which comprises a. graphite
b. a binder consisting of either
   i. a complex phosphate of aluminium containing at least one chemically bound molecule of a hydroxy compound, ROH, wherein R is an organic group of hydrogen and an anionic group of a strong inorganic acid, other than an oxyphosphorus acid, or of a carboxylic acid, or
   ii. an aluminum phosphate in which the ratio of the number of gram atoms of aluminum to the number of gram atoms of phosphorus is at least 1:1; and
c. a dispersant for the binder, the binder being present in an amount of 0.5 to 25 percent by weight of the composition.

The compositions may be used for a wide range of purposes and especially for moulding to produce shaped articles but also for purposes in which the hardening of the composition, its ready adherence to its surroundings and the heat-resistance of the product can be utilised. It may be used, for example as a mortar, cement or filler for example for binding ceramics or for high temperature applications for example in furnace walls and linings. The proportions of the components and the consistency of the mixes can be chosen to make them of optimum value for the use intended.

The objects that may be formed from the compositions of the invention include electrodes, e.g. for electric furnaces such as those for producing steel; anodes for electrolysis cells, e.g. diaphragm chlorine cells, mercury cells, chlorate cells and fused salt cells for production of alkali metals, calcium and magnesium; brushes for rotors and dynamos; sleeves and thrust bearings; sealing and packing rings; electronic tube anodes and grids, nuclear reactor moderates, reflectors and thermal columns; rocket rotor nozzles; missile rudder vanes, carbon arcs; moulds, dies, furnace blazing rigs and crucibles; linings for furnaces etc; heat-exchangers, diaphragms; leads, heads, nozzles, conducting paints e.g. for wall heating, and other conducting compositions, e.g. for underground or surface-heating of roads, pathways and playing fields; and fibres.

The relative proportions of the components of the compositions may vary over a wide range. Suitable percentages by weight of the compositions for the components may be as follows:

| Graphite | 10 to 95% |
|---|---|
| Binder | 0.5 to 25% |
| Dispersant | 1 to 50% |

Preferably, the binder is present in an amount of 2 to 10% by weight of the composition.

Generally, the weight ratio of graphite to binder may be from 20:1 to 1:1.

Any grade of graphite may be used, the particular grade being chosen to suit the use to which the composition is to be put. If desired mixtures of different grades may be used. Examples of suitable grades include baked carbon, electrographite, impervious carbon and impervious graphite, electrode graphite, unpurified, thermally-purified and chemically-purified nuclear graphite, pyrographite and porous graphite.

The complex phosphates which are particularly preferred are those in which the anionic group is a halogen, and preferably chlorine although the complexes may contain other halogens, for example bromine or iodine. These halogen containing complex phosphates are more fully described in U.S. Application No. 42,499 — now Continuation Application No. 274,964 (corresponding to Dutch Application No. 70,08594). Other suitable complex phosphates are those in which the anionic group is other than halogen. Of this latter type, those in which the R is an organic group are more fully described in our U.S. Application 296,983 and those in which R is hydrogen are more fully described in U.S. Application No. 296,985. Examples of these other anionic groups include nitrate which is particularly preferred, sulphate, acetate, benzoate and perchlorate.

In the complex phosphates, where R is an organic group, it is preferred that it be an aliphatic hydrocarbon group or a substituted aliphatic hydrocarbon group, for example wherein the substituent is one or more of the following: amino, phenyl, hydroxyl, carboxyl or alkoxy. Unsubstituted aliphatic alcohols are especially preferred as the hydroxy compound since complex phosphates containing them are easily separated solids obtainable in high yield. We have found that aliphatic alcohols containing one to ten carbon atoms are especially suitable, and owing to their ready availability we prefer to use aliphatic alcohols containing from one to four carbon atoms, for example, methanol, ethyl alcohol, n-propyl alcohol or isopropyl alcohol.

The ratio of the number of gram atoms of aluminium to the number of gram atoms of phosphorus in the complex phosphate may vary over a wide range, for example, from 1:2 to 2:1, more especially 1:1 to 2:1, but is preferably substantially 1:1. The ratio of the number of gram atoms of aluminium to the number of gram atoms of halogen in the complex phosphates is preferably substantially 1:1.

The complex phosphates may be monomeric or polymeric. The monomeric forms, or the repeating units of the polymeric forms of the complex phosphates, may contain, for example, from one to five molecules of the hydroxy compound. Most frequently the number of molecules of the hydroxy compound is four. In some cases the complex phosphates may contain molecules of different hydroxy compounds, for example they may contain both chemically-bound water and a chemically-bound organic hydroxy compound, the total number of such molecules being, for example, from two to five.

Examples of complex phosphates include:

a. that containing chlorine and ethyl alcohol and having the empirical formula $AlPClH_{25}C_8O_8$. The infra-red and X-ray characteristics of the compound are described in Example 1 of the aforesaid copending Application No. 274,964. It is designated aluminium chlorophosphate ethanolate, and for convenience is referred to herein as ACPE;

b. that containing chemically bound water and chlorine and having the empirical formula $AlPClH_{11}O_9$. The infra-red and X-ray characteristics of the compound are described in Example 6 of the aforesaid copending Application No. 274,964. It is designated aluminium chlorophosphate hydrate, and ifor convenience is referred tp as ACPH;

c. that containing bromine and ethyl alcohol having an empirical formula $AlPBrH_{25}C_8O_8$. The infra-red and X-ray characteristics of the compound are described in Example 7 of the aforesaid copending Application No. 274,964. It is designated aluminium bromophosphate ethanolate, and for convenience is referred to as ABPE.

It is to be understood, however, that these designations in no way imply any particular molecular structures for the compounds.

A particularly suitable halogen containing complex phosphate containing chemically bound water is that obtained by the process described in U.S. Application No. 245,196 in which aluminium orthophosphate hydrate is contacted with a reactant gas comprising halogen-acid gas and/or a gaseous halogen. When the gas is hydrogen chloride and the hydrate $AlPO_4 \cdot 3H_2O$, a compound containing three molecules of water is obtained and having the empirical formula $AlPClH_7O_7$.

When using aluminium phosphate itself it is generally desirable to use aluminium orthophosphate ($AlPO_4$) or its hydrates. The aluminium phosphate may be added as such to the composition or it may be formed in situ, for example, by dissolving or dispersing aluminium or a suitable compound in orthophosphoric acid. Suitable compounds include aluminium oxide or hydroxide or the aluminium salt of a volatile acid, e.g. aluminium nitrate, chloride, oxychloride or hydroxy chloride. Suitably, the orthophosphoric acid may be mixed with a volatile acid, particularly when using aluminium or a compound other than the salts of the volatile acid. When using phosphoric acid it is essential to avoid using an excess so that the Al:P ratio does not fall below 1:1.

The dispersant, generally a liquid dispersant, is preferably a solvent for the aluminium phosphate or complex although the binder may be dispersed in the dispersant, for example, as a suspension, sol or gel.

Suitable solvents for the complex phosphates are disclosed in our Application No. 274,964, and are preferably polar solvents, e.g. methanol, ethanol, isopropanol, butanol, ethylene glycol monoethyl ether, water or a mixture of two or more such solvents. Mixtures of solvents may be used, for example a mixture of chloroform with methanol.

It is important that the dispersant is not one which will change the Al:P ratio in the aluminium phosphate to less than 1:1. Thus, when using aluminium orthophosphate ($AlPO_4$) it is desirable to dissolve it in an aqueous acid, preferably one that will volatilise without too much difficulty and preferably a mineral acid, e.g. hydrochloric, nitric or sulphuric acid. Phosphoric acid, which is commonly used for dissolving aluminium acid phosphates in known moulding compositions, is unsuitable since it would adversely affect the Al:P ratio. If desired, other solvents or dispersants may be included, particularly organic solvents, e.g. alcohols of 1 to 5 carbon atoms.

The compositions, may in addition to the aluminium phosphate or complex phosphate binder, comprise one or more other binders. Examples of such binders include silicates e.g. alkyl silicates, such as ethyl or isopropyl silicate, aminoalkyl silicates, monoethanolamine orthosilicate, alkali metal silicates such as sodium and/or potassium silicate; silica sols; metal oxychlorides such as aluminium oxychloride; gypsum/silica mixes and cements such as aluminous or Portland cement.

The compositions of the invention may include a wide variety of other additives. Thus they may include a small quantity of a surface-active agent in an amount of for example 0.1 percent to 2 percent by weight of the composition.

For many applications it is desirable to include a refractory and/or ceramic material in the compositions, particularly when preparing objects for refractory uses, e.g. metallurgical crucibles, heads and nozzles.

Suitable refractory or ceramic materials include coke; silica; alumina, e.g. tabular alumina and bauxite; magnesium and calcium oxides; zinc and tin oxides; magnesite; magchrome grog; zirconium silicate; zirconia; zircon; aluminium silicate, e.g. sillimanite, andalusite, kyanite, nullite and molochite; porcelain and china clays; carbides, e.g. silicon and tungsten carbide; nitrides, e.g. silicon and boron nitride; boron; asbestos; ferric oxide; chromium oxide; chromite; and mica as well as aluminium phosphate itself. The weight ratio of refractory material to graphite may be for example from 5:1 to 1:10.

For many applications it is desirable to include a metal, particularly when preparing objects for electrical uses e.g. slip rings. Suitable metals include copper, lead, tin, zinc, aluminium and silver. The weight ratio of metal to graphite may be for example from 10:1 to 1:10.

The compositions may also include various substances to aid plasticity of the compositions. Examples of such substances include clays e.g. bentonite, and clay substitutes such as cellulose ethers, e.g. methyl cellulose, ethyl cellulose, ethyl methyl cellulose, hydroxyethyl methyl cellulose and hydroxy-propyl methyl cellulose. The proportion of such additives may be for example from 0.01 percent to 5 percent by weight.

The composition may also include small quantities, e.g. 0.1 percent to 5 percent by weight of corrosion inhibitors, e.g. chromic oxide or "Rodine". Other additives may include pigments, suspension agents and viscosity modifiers. If desired the compositions may be foamed to form light weight solid shapes having a cellular structure. Thus the compositions may also incorporate foaming and/or blowing agents. Examples of suitable foaming agents include various surface-active agents e.g. cationic, anionic and non-ionic detergents including those sold under the trade names "Aphrosol," "Komet-Extrakt," "Sthamex" and "Gloquat." Alternatively or additionally, a surface-active agent having a highly-fluorinated claim may be used as the foaming agent. Examples of these are described in U.S. Applications Nos. 26,158 (now abandoned); 818,081, and 157,736.

As blowing agents there may be used any of the conventional agents such as fluorocarbon propellants and other volatile organic compounds as well as inorganic substances such as sulphur hexafluoride, carbon dioxide, argon or nitrogen.

The blowing agent may be generated in situ. For example, when the binder is acidic, as for example it may be in the case of the complex phosphates, a basic substance such as magnesium carbonate, may be incorporated which will react with the complex phosphate on mixing in the dispersant. When the dispersant is an organic liquid, reaction to form carbon dioxide is suitably controlled.

According to the invention there is also provided a process for making a solid shape which comprises forming a shape from a composition of the invention and treating the formed shape to set it.

Generally the formed shape is treated by heating, e.g. to temperatures of 80° to 1,200°C, e.g. 200° to 1,200°C. Suitably the formed shape in its "green" state is first dried, e.g. at a temperature of 80° to 250°C before being transferred to a furnace for high-temperature firing.

It may be desirable to carry out the heating, particularly when at high temperatures, in an inert atmosphere, e.g. nitrogen or argon.

Suitably, the shapes may be formed by extruding, pressing or moulding, e.g. by compression or jar moulding, a composition of the invention, preferably in the form of a paste. The density and strength of the solid shape is usually a function of the moulding pressure, which may vary, for example from 14 kg/cm$^2$ to 1,575 kg/cm$^2$, and also the firing temperature.

When the object to be formed is a fibre it is suitably prepared by forming a concentrated suspension of graphite particles in a non-aqueous solution of a linear organic polymer. Examples of desirable solvents include alcohols, glycols or halogenated hydrocarbons or mixtures of these, e.g. a mixture of methanol and chloroform. High boiling solvents may also be used to help preserve plasticity in the filament to be drawn. Suitable solvents include methyl cellulose. Examples of suitable polymers include polyvinyl butyral, polyvinyl formal and cellulose ethers e.g. hydroxypropyl cellulose. The binder, e.g. ACPE, is added to the dispersion to form a paste. Conveniently, the polymer comprises 0.1 to 10% by weight of the paste. The paste is then extruded through a spinnerette into a controlled atmosphere. Generally the filament so formed is drawn down to a diameter less than the diameter of the filament leaving the spinnerette, thereby orientating the graphite.

Desirably the controlled atmosphere is anhydrous and suitably comprises air or nitrogen together with the solvent for the polymer.

The invention also provides a dry formulation suitable for preparation of the compositions of the invention which comprises a mixture of graphite and a solid complex phosphate of aluminium (as herein described).

As mentioned above, the preferred complex phosphates are those designated ACPE and ACPH. These compounds are stable in air and so can form stable dry formulations which may be mixed with a suitable dispersant prior to use of the compositions of the invention.

The invention is illustrated in the following Examples in which parts and percentages are by weight. In the Examples ACPE and ACPH refer to the chlorine-containing complex aluminium phosphates mentioned previously and obtained by the procedure of Examples 1 and 6, respectively, of U.S. Application No. 274,964 (Dutch Application No. 70,08594).

EXAMPLE 1

A synthetic graphite mixture was made up from graphite grades OG1, -200 and 22A (ex Pitch Marketing Company Limited) in the ratio 10:20:70 by weight. 15g of the mixture were mixed with 2.5g ACPE and 1 cc of water. The mixture was placed in a stainless steel mould and a pressure of 24.5 kg/cm$^2$ applied. The block was then removed from the mould and dried for 1 hour at 140°C after which it was fired for 1 hour at 300°C. The final block has a crushing strength of 42 kg/cm$^2$ and a specific gravity of 1.40.

EXAMPLE 2

To 15g of the mixed synthetic graphite (as described in Example 1) was added 2g ACPH and 1 cc of water. After thorough mixing, the mixture was placed in a stainless steel mould and a pressure of 24.5 kg/cm$^2$ applied. The block was removed from the mould and dried for 1 hour at 140°C after which it was fired at 300°C for 1 hour. The final block had a crushing strength of 40 kg/cm$^2$ and a specific gravity of 1.44.

EXAMPLE 3

14g of molochite mix (45 parts of particle size 3.2 to 6.4 mm, 10 parts of particle size 0.25 to 0.5 mm of particle size less than 0.075 mm were mixed with 6g of the mixed synthetic graphite (as described in Example 1). To the mixture was added 2g ACPH and 1g water. After thorough mixing the mixture was placed in a stainless steel mould and a pressure of 49 kg/cm$^2$ applied. The block was removed from the mould and dried for 1 hour at 140°C after which it was fired at 500°C for 1 hour. The crushing strength of the block was 98 kg/cm$^2$ and the specific gravity 1.85.

EXAMPLE 4

To a mixture of 14g of the mixed molochite of Example 3 and 6g of the mixed synthetic graphite (as described in Example 1) was added 2g ACPE and 1.5g water. The mixture was placed in a stainless steel mould and a pressure of 49 kg/cm$^2$ applied. The block was removed from the mould and dried at 140°C for 1 hour and then fired for 1 hour at 500°C. The final block had a crushing strength greater than 44 kg/cm$^2$ and a specific gravity of 1.79.

The advantages of the compositions of the invention in producing graphite objects over prior art graphite materials include the fact that the objects can be formed much more quickly, easily and at lower temperatures and the binder helps to protect the graphite against oxidation so that the objects can be used at higher temperatures than before.

We claim:
1. A composition which comprises:
   a. particulate graphite;
   b. A binder which is a complex phosphate of aluminium containing at least one chemically-bound molecule of a hydroxy compound, ROH, wherein R is selected from the group consisting of an organic group and hydrogen, and an anionic group selected from the group consisting of a strong inorganic acid, other than an oxyphosphorus acid, and a carboxylic acid; and
   c. a dispersant for the binder; the binder being present in an amount of 0.5 to 25% by weight of the composition.
2. A composition according to claim 1 in which the binder is present in an amount of 2 to 10 percent by weight of the composition.
3. A composition according to claim 1 in which the ratio of the number of gram atoms of aluminium to the number of gram atoms of phosphorous in the complex phosphate is at least 1:1.

4. A composition according to claim 3 in which the ratio is substantially equal to 1:1.

5. A composition according to claim 1 in which the hydroxy compound of the complex phosphate is an aliphatic alcohol containing 1–4 carbon atoms.

6. A composition according to claim 5 in which the alcohol is ethyl alcohol.

7. A composition according to claim 1 in which the anionic group is selected from the group consisting of a sulphate, acetate, benzoate, perchlorate and nitrate.

8. A composition according to claim 1 in which the anionic group of the strong inorganic acid is a halogen.

9. A composition according to claim 8 in which the halogen is chlorine.

10. A composition according to claim 9 in which the complex phosphate contains four molecules of chemically-bound ethyl alcohol and has the empirical formula $AlPClH_{25}C_8O_8$.

11. A composition according to claim 9 in which the complex phosphate contains five molecules of chemically-bound water and has the empirical formula $AlPClH_{11}O_9$.

12. A composition according to claim 8 in which the complex phosphate contains three molecules of water and has the empirical formula $AlPClH_7O_7$.

13. A composition according to claim 1 which comprises 10 to 95 percent by weight of graphite and 1 to 50 percent by weight of dispersant.

14. A composition according to claim 1 in which the weight ratio of graphite to binder is from 20:1 to 1:1.

15. A composition according to claim 1 in which the dispersant is a solvent for the binder.

17. A dry formulation comprising a mixture of graphite and a solid complex phosphate of aluminum as defined by claim 1 and suitable for preparation of the said composition.

18. A process for making a solid shape which comprises forming a shape from the composition of claim 1 and heating the formed shape to a temperature in the range 80° 1,200°C to set it.

19. A process according to claim 18 in which the shape is formed by extruding, pressing or moulding.

* * * * *